(12) United States Patent
Gombar (10) Patent No.: US 10,827,887 B2
(45) Date of Patent: Nov. 10, 2020

(54) MOUNTABLE TOILET SYSTEM AND METHOD

(71) Applicant: Gary Gombar, Peoria, AZ (US)

(72) Inventor: Gary Gombar, Peoria, AZ (US)

(*) Notice: Subject to any disclaimer, the term of this patent is extended or adjusted under 35 U.S.C. 154(b) by 109 days.

(21) Appl. No.: 16/197,272

(22) Filed: Nov. 20, 2018

(65) Prior Publication Data

US 2020/0154961 A1 May 21, 2020

(51) Int. Cl.
*A47K 13/00* (2006.01)
*A47K 11/02* (2006.01)
*A47K 13/26* (2006.01)

(52) U.S. Cl.
CPC ............ *A47K 13/005* (2013.01); *A47K 13/26* (2013.01); *A47K 11/02* (2013.01)

(58) Field of Classification Search
CPC ....... A01M 31/02; A01M 31/025; A47C 9/10; E03G 3/24; F16M 13/02; F16M 13/022; A47K 13/005; A47K 13/12; A47K 13/26; A47K 11/02
See application file for complete search history.

(56) References Cited

U.S. PATENT DOCUMENTS

| | | | | |
|---|---|---|---|---|
| 1,563,236 | A | * | 11/1925 | Smith ..................... A47K 13/00 248/439 |
| 2,833,333 | A | * | 5/1958 | Babineau .................. E04G 3/24 182/187 |
| 3,065,821 | A | | 11/1962 | Hundley, Jr. |
| 4,022,292 | A | * | 5/1977 | Van Gompel ......... A01M 31/02 182/33 |
| 4,579,198 | A | | 4/1986 | Lee |
| 5,083,324 | A | | 1/1992 | Strong |
| 5,230,105 | A | | 7/1993 | Watson |
| 5,450,927 | A | * | 9/1995 | Harton ................... A01M 31/02 182/187 |
| 5,852,832 | A | | 12/1998 | Voigt et al. |
| 6,023,792 | A | | 2/2000 | Croucher et al. |
| 6,081,942 | A | | 7/2000 | Bellamy |
| 6,546,569 | B2 | | 4/2003 | Figueras |
| 6,775,860 | B2 | | 8/2004 | Unruh |
| 7,103,926 | B1 | | 9/2006 | Rasberry |
| 7,200,878 | B2 | | 4/2007 | Payne |
| 7,927,321 | B2 | | 4/2011 | Marland |
| 8,925,681 | B1 | | 1/2015 | Mattingly |
| 9,027,709 | B2 | | 5/2015 | Wheelington |
| 9,161,665 | B2 | * | 10/2015 | Cahoon .................. A47K 11/04 |
| 2011/0241397 | A1 | | 10/2011 | Spencer |
| 2017/0354301 | A1 | | 12/2017 | Sandberg |

FOREIGN PATENT DOCUMENTS

DE 809611 C * 7/1951 ............ A01M 31/02

* cited by examiner

*Primary Examiner* — Erin Deery
(74) *Attorney, Agent, or Firm* — Bycer Law, PLC; Matthew L. Bycer (57) ABSTRACT

A mountable toilet system including a mountable toilet assembly including a frame having a top-engager including a straight-arm with a toothed-hook. The toothed hook wraps a far end of a tree trunk. A second bottom member may also include a toothed-terminal end for engaging the tree trunk. A seat-platform hindgedly couples both top and bottom members to support a seat having periphery ring and a through-hole. The mountable toilet system can be collapsed for convenient to transport and storage.

24 Claims, 6 Drawing Sheets

MOUNTABLE TOILET SYSTEM AND METHOD

BACKGROUND OF THE INVENTION

Technical Field

The present invention relates generally to the field of chairs with toilet conveniences or specially adapted for use with toilets of existing art. and more specifically relates to a mountable toilet system and method for use in outdoor environments.

Related Art

Many individuals enjoy spending time in the great outdoors for work and pleasure, including tenting, hiking, fishing, and hunting. Some individuals enjoy camping with trailers that may include indoor toilet facilities. Tents often do not come equipped with toilet facilities, and many campsites do not include permanent washrooms with toilets. Outdoorsmen and outdoorswomen appreciate a comfortable means by which to relieve themselves in an outdoor setting. A suitable solution is desired.

U.S. Pat. No. 5,083,324 to Eric A. Strong relates to a portable collapsible toilet seat. Strong demonstrates the feasibility of ad hoc toilets in a wilderness environment, where there is no plumbing system available for operatively connecting a conventional toilet. Strong's toilet seat includes a seat member having a clamp means at its rear edge for rigidly attaching the seat member to the trunk of a tree in a wilderness setting. A foldable leg structure, or brace bar, is swingably attached to the front edge area of the seat member for supporting the front portion of the seat member. The foldable leg structure supports the front portion of the seat member above ground surface and requires such vertical support.

It is therefore an object of the present invention to provide a mountable toilet seat that can be mounted to a vertical structure without need for support on a horizontal surface (e.g. ground surface).

It is a further object of the present invention to provide a method of installing a toilet seat by mounting upon a vertical structure.

SUMMARY OF THE INVENTION

The present disclosure provides a novel mountable toilet system and method to provide an efficient, portable and mountable toilet system for use in coupled combination with vertical structures such as trees, poles, and the like.

A mountable toilet system may include a mountable toilet assembly including a frame having a top-engager including a straight-arm leading to a toothed-hook (preferably having a plurality of teeth); the toothed hook is configured to have a slight inward curve to removably frictionally engage a vertical member, such as a tree trunk. A bottom-engager (the top-engager nor bottom-engager singly comprising a clamp) having a terminal end that may or may not also have a plurality of teeth for engaging the vertical member (the top-engager and the bottom-engager acting in combination to promote horizontal-toothed-engaging-and-coupling of the mountable toilet assembly to the vertical member). A seat-platform may be hindgedly coupled to both the top and bottom members (preferably to the top member via the straight-arm via a first-hinge. The seat platform may support a seat which may include a complete or partial periphery ring, and a through hole sufficient in size by which to defecate and/or urinate therethrough.

The present invention is not connected to nor requires any plumbing fixtures, yet functions as a convenient outdoor toilet for comfortable use. When the user sits on the device it biases to the vertical member from the downward compression forces caused by the mass of the user. The bottom member engages the certical support at an angle to support the front of the seat platform, and the top member is pulled along the back of the vertical support member. The top member may be angled from the seat platform plane. The frame may be made from a squared or round tubing, and preferably includes a reasonably lightweight and durable material. The frame of the apparatus may be welded or otherwise machined, molded or manufactured.

The straight-arm with the toothed-hook is hingedly coupled to the seat-platform. The straight-arm may include a handle (preferably) integral with the frame located on the top-engager. In preferred embodiments the mountable toilet assembly further has a projecting toilet paper roll bar, that may be coupled to the straight-arm. In the preferred embodiments the projecting toilet paper roll bar is integral with the top-engager and the straight-arm is integral with the toothed-hook; however alternate embodiments may be non-integral. Relationally speaking, the first-hinge is perpendicularly oriented to the straight-arm and a first-fastener is able to be received therethrough to provide convenient coupling of the top-engager to the seat-platform. The handle and the projecting toilet paper roll bar are located on the same side of the straight-arm such that they do not impede engagement with the vertical member when used. The projecting toilet paper roll bar may also comprise a raised lip on the end such that the toilet paper roll is suitably held in position during use.

The seat is preferably a toilet-style shape (as to size and profile) and is configured to engage a human body of a user in a seated position during an in-use condition. The seat may be removably coupleable to the seat-platform via at least one fastener preferably comprising hook and loop fastening means or other suitable equivalent. Certain embodiments may be pivotable about an axis of rotation such that the seat can be 'lifted' or 'lowered'. The seat-platform preferably comprises a second-hinge and a third-hinge such that the seat-platform is able to rotate in relation to the bottom-engager and the seat-platform comprises a plurality of support bars to support the seat when sat upon by the user.

The seat and/or seat-platform may include hooks (or the suitable equivalent) for removably receiving a droppings-bag (e.g. grocery bag, garbage bag, or the like) underneath a plane of the seat and/or seat-platform during in-use conditions when the seat and/or seat platform are preferably horizontal (meaning flat, give or take twenty degrees). The bag may be removed and disposed of when use is completed. The plurality of support bars in preferred embodiments comprise a left-side-support-bar and a right-side-support-bar (parallel to each other) and may further comprise a rear-cross-bar perpendicular to the left-side-support-bar and the right-side-support-bar (adjoining the left- and right-support bars). The left-side-support-bar and the right-side-support-bar each have the second-hinge and the third-hinge attached respectively such that the bottom-engager is able to rotate in relation to the seat-platform. Certain embodiments may have a front-cross-bar.

The vertical member is preferably a tree trunk with a trunk-diameter, or other substantially vertical (and preferably cylindrical) member that is planted into a ground volume with sufficient rigidity. Alternatively, the vertical member may hang and be supported from above. As designed, the toothed-hook of the top-engager and the terminal end of the bottom-engager engage the vertical member with a slight curve to form a 'bite' when installed and the frame does not need to engage a ground-surface for stable use. For convenience the top-engager, the seat-platform, and the bottom-engager are able to rotate in relation to one another respectively in series such that the mountable toilet assembly is readily collapsible and portable.

The present invention also includes a method of use of the mountable toilet system by unfolding the top-engager, the seat-platform, and the bottom-engager via rotating each in relation to one another respectively in series; engaging the toothed-hook with a back of the tree trunk, optionally modifying the length of the straight arm via a telescoping structure to adjust the length of the straight arm to better orient the seat platform in a horizontal position; engaging the terminal end to a front of the tree trunk; and sitting on the seat (as a human body in a seated position) during an in-use condition. The method may further include attachment and removal of a bag, and collapsing the mountable toilet assembly for transport and storage. Further steps of placing a roll of toilet paper on the projecting toilet paper roll bar and using the roll sequentially as well as hanging a bag from the hooks provided may be included. Further the device when moved may be carried via a handle. Certain embodiments may be telescoping (thus may be telescoped for suitable adjustment).

DETAILED DESCRIPTION

The present disclosure relates to chairs with toilet conveniences or specially adapted for use with toilets and more particularly to a mountable toilet system as used to improve the convenience of defecating/urinating comfortably in outdoor environments.

Generally, the features and structure of the mountable toilet system include: a rear hook with teeth to set around the tree including teeth to grip the tree trunk; the rear hook affixed to a straight arm, or otherwise hingedly connected to the arm; the arm is attached to the rear hook and includes a side handle. The arm also includes a projecting toilet paper roll bar (potentially built-in as shown or clipped on). The arm may be telescoping or non-telescoping. The arm is hingedly coupled to the seat plane (seat-platform) including at least one hinge for coupling with the arm, preferably as a back bar to support the back of the seat, and perpendicular to the arm. The seat-platform may include two bars (oriented parallel with the arm) and may or may not include a rear and/or front cross bar. The lower mount (bottom-engager) is hingedly coupled to the seat-platform and includes a cross-mount bar with teeth (toothed-terminal end). All sections that meet the tree are toothed and hooked at a slight curve to form a 'bite' into the bark/trunk. The seat may be removable, via hook and loop fasteners (such as those sold under the tradename VELCRO®) or other suitable fastening means. The bottom of the seat is outfitted with hooks to allow a trash bag, shopping bag, or the like to be fit under the seat to catch droppings. The product is completely collapsible and portable, to be carried by the handle.

Referring now more specifically to the drawings by numerals of reference, there is shown in FIGS. 1-4, various views of a mountable toilet system 100.

Figure 1:
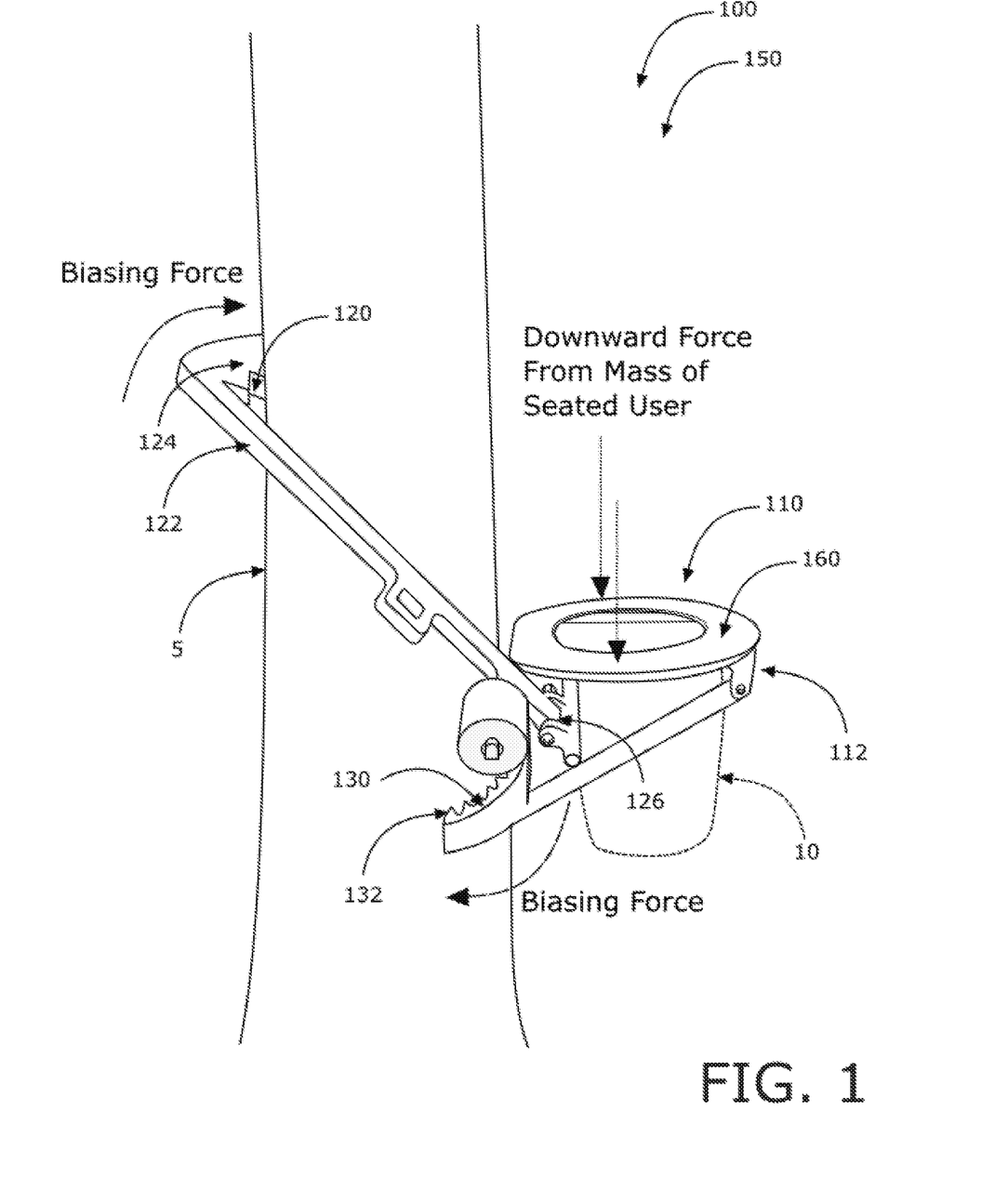
FIG. 1 is a side perspective view of the mountable toilet system installed ready for an 'in-use' condition, according to an embodiment of the disclosure.

FIG. 1 shows a mountable toilet system 100 in an installed position ready for an 'in-use' condition 150, according to an embodiment of the present disclosure. Here, the mountable toilet system 100 may be beneficial for use by a user to comfortably relieve themselves in an outdoor setting. As illustrated, the mountable toilet system 100 may include a mountable toilet assembly 110 including a frame 112 having a top-engager 120 including a straight-arm 122 with a toothed-hook 124; the toothed hook 124 configured to removably frictionally engage a vertical member 5, a bottom-engager 130 having a toothed-terminal end 132 for engaging the vertical member 5; a seat-platform 140 hindgedly coupled to the straight-arm 122 of the top-engager 120 via a first-hinge 126; and a seat 160. As designed the straight-arm 122 with the toothed-hook 124 is hingedly coupled to the seat-platform 140 and the mountable toilet assembly 110 is collapsible and portable. The present invention may comprise a handle 170 for ease in carrying the device between locations. Downward force(s) caused by the mass of the user when seated upon the seat 160 (and that of gravity) are indicated by directional arrows with dotted lines. The resulting biasing forces are also shown with directional arrows indicated with dashed lines. The resulting 'biasing' forces in combination with the 'biting action' of the teeth of the toothed hook 124 and that of the toothed-terminal end 132 to the vertical member 5 act to allow the present invention to positively grip the vertical member 5 during use.

Figure 2:
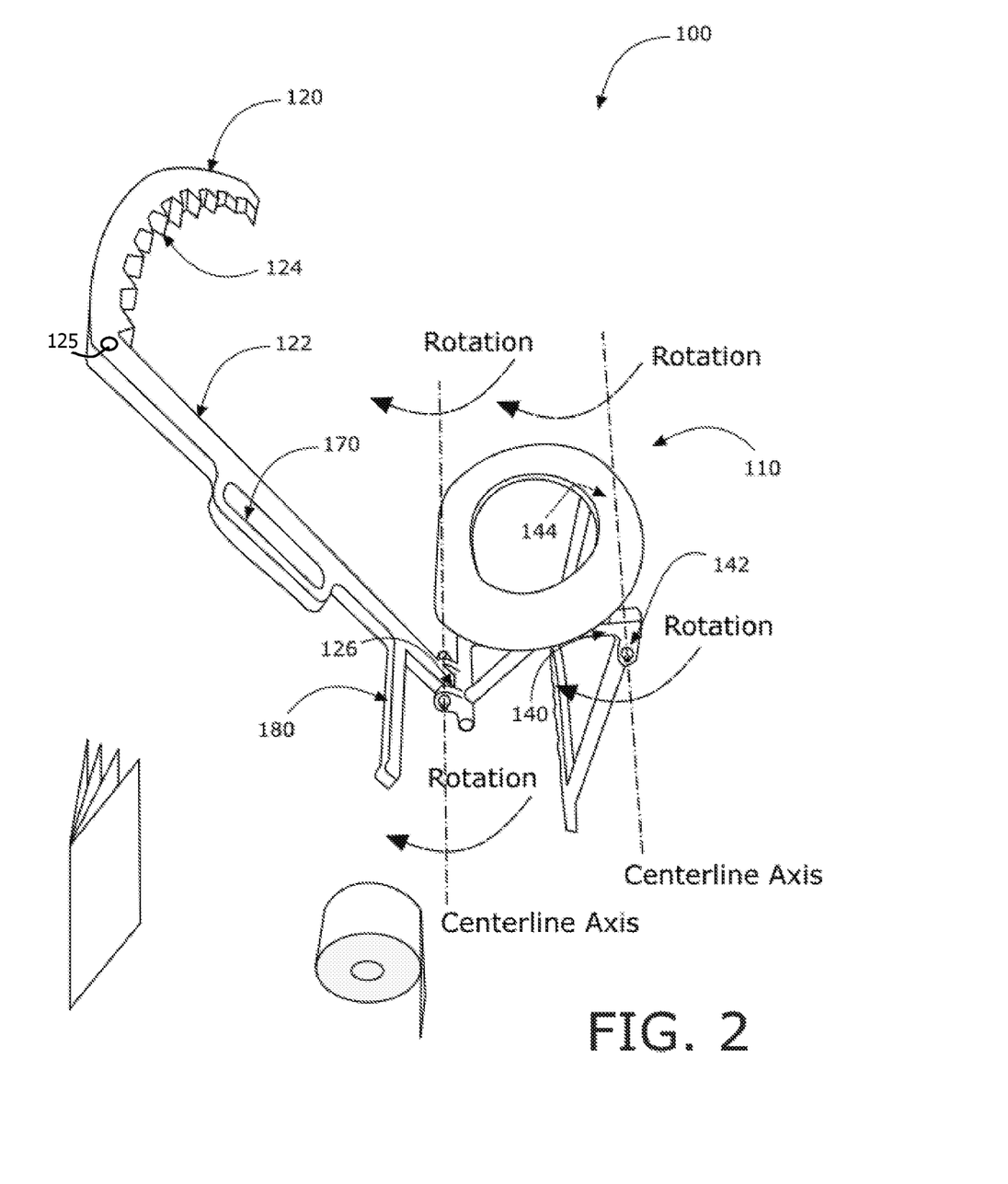
FIG. 2 is a perspective view of the mountable toilet system of FIG. 1, according to an embodiment of the present disclosure.

According to one embodiment, the mountable toilet system 100 may be arranged as a kit. In particular, the mountable toilet system 100 may further include a set of instructions, toilet paper roll(s) or the like as shown in FIG. 2. In additional to the main components discussed herein removable handles and projecting toilet paper roll bars may also be included in particular embodiments. The instructions may detail functional relationships in relation to the structure of the mountable toilet system 100 such that the mountable toilet system 100 can be used, maintained, or the like, in a preferred manner.

Figure 3:
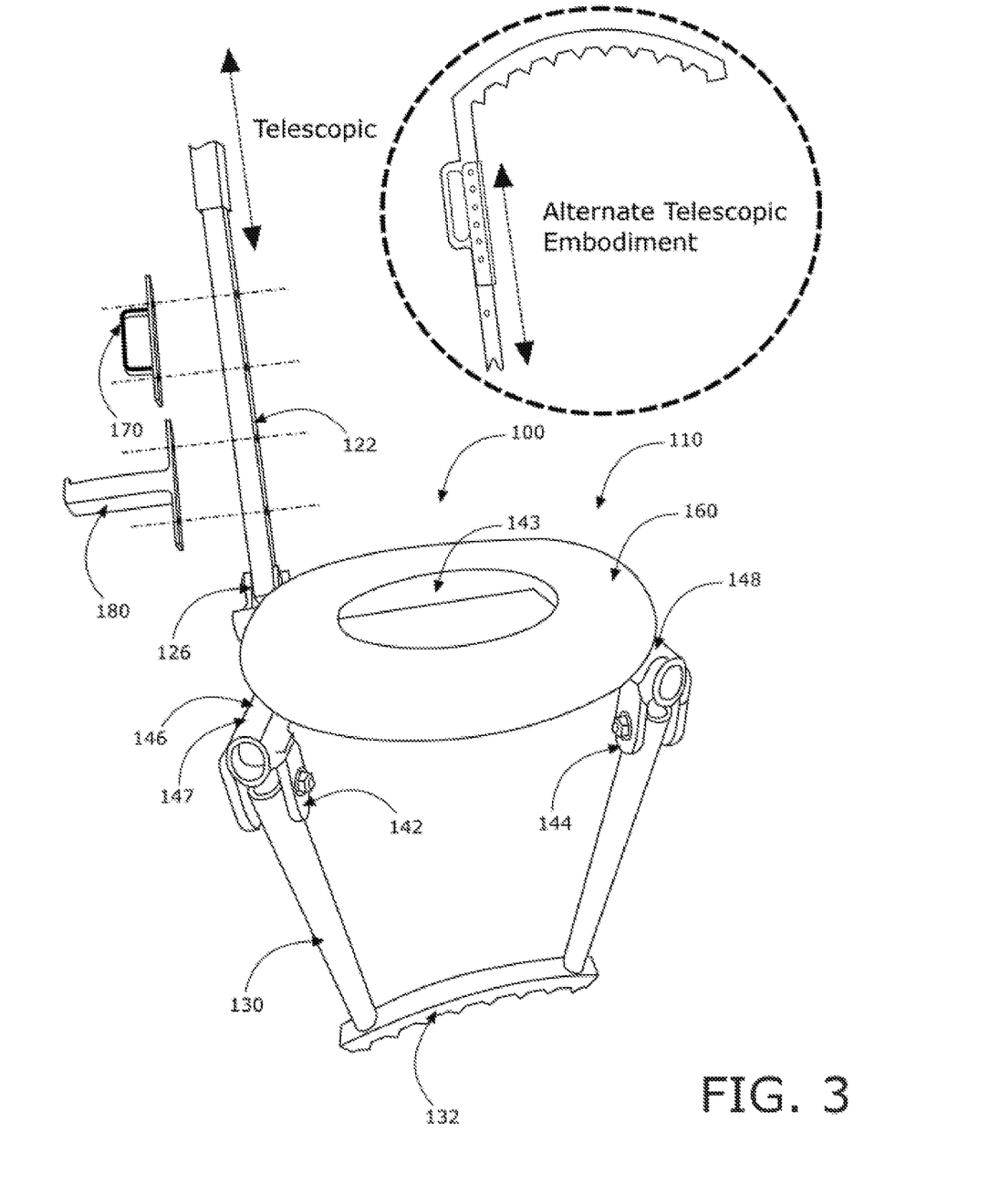
FIG. 3 is a front perspective view of the mountable toilet system of FIG. 1, according to an embodiment of the present disclosure.
Figure 4:
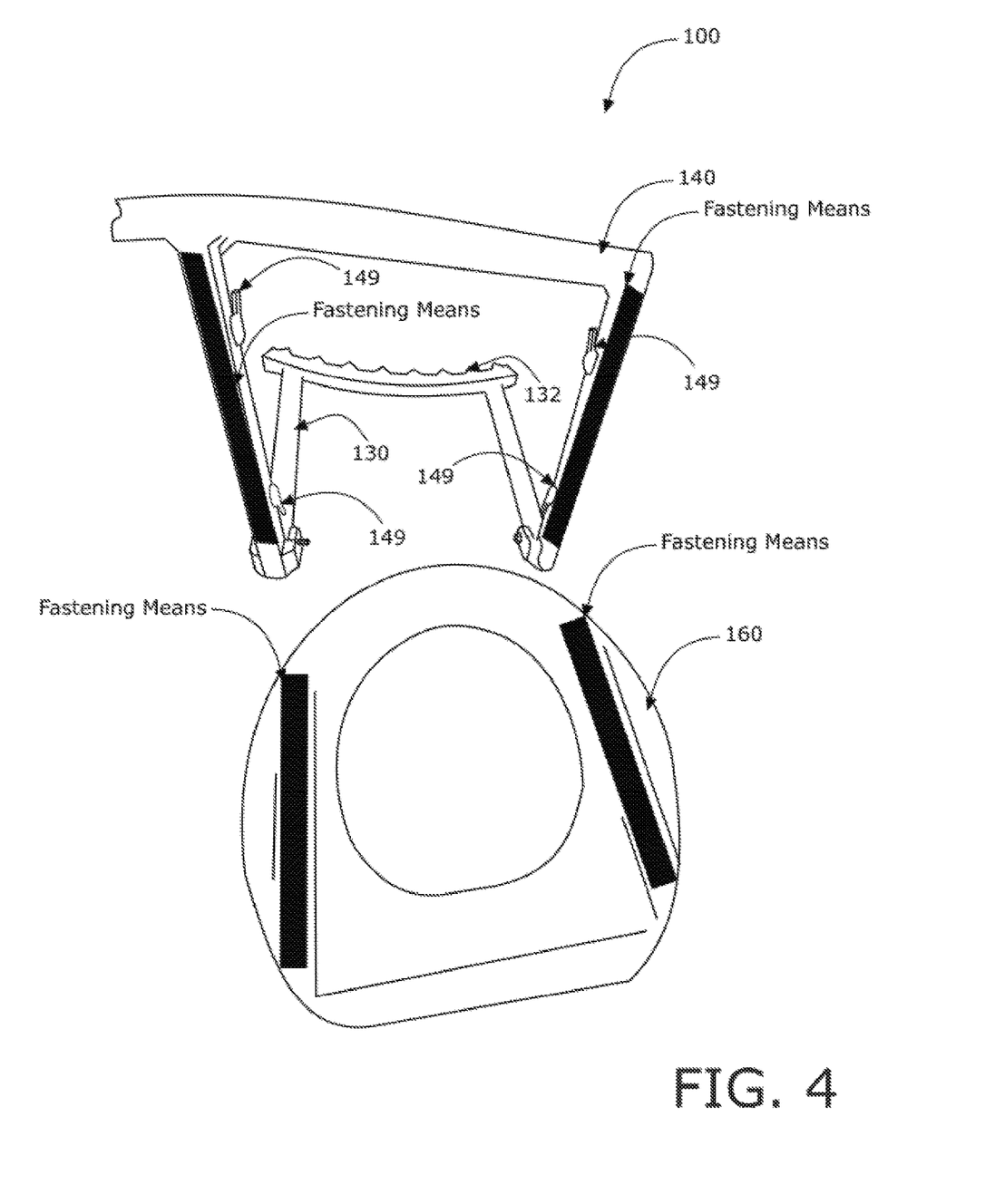
FIG. 4 is another perspective view of the mountable toilet system of FIG. 1, according to an embodiment of the present disclosure.

Referring now to FIGS. 2-4 showing various views of the mountable toilet system 100 of FIG. 1, according to an embodiment of the present disclosure.

As mentioned previously the mountable toilet assembly 110 of the mountable toilet system 100 may further comprises a handle 170 with preferred embodiments being integral with the frame 112 and located on the top-engager 120 (FIG. 1); non-integral (removably fastenable) handle 170 is shown in FIG. 3. To further provide convenience the mountable toilet assembly 110 may further comprises a projecting toilet paper roll bar 180 on which a toilet paper roll may be removably placed. The toilet paper roll can be 'turned' on the projecting toilet paper roll bar 180 such that toilet paper (shown in FIG. 1) can be sequentially removed for use from the roll. When the toilet paper roll is finished it can be removed and another 'fresh' roll can be placed on the projecting toilet paper roll bar 180 for use. In certain embodiments of the mountable toilet system 100 the projecting toilet paper roll bar 180 is integral with the top-engager 120 (FIGS. 1 and 2) and in alternate embodiments the projecting toilet paper roll bar 180 is non-integral with the top-engager 120 (FIG. 3) and is able to be removably fastened to the top-engager 120 via suitable means such as clips, clasps, fasteners or the like.

Referring now to the straight-arm 122; straight-arm 122 may be telescopic (as indicated by directional arrow in FIG. 3) or non-telescopic (FIGS. 1, 2 and 4). The straight-arm 122 is preferably integral with the toothed-hook 124; however, in certain alternate embodiments the straight-arm 122 is non-integral with the toothed-hook 124 and the straight-arm 122 is hingedly connected at hinge point 125 to the toothed-hook 124. Relationally speaking, the first-hinge 126 is perpendicularly oriented to the straight-arm 122 and a first-fastener is able to be received therethrough to provide coupling of the top-engager 120 to the seat-platform 140. Rotation about the first-hinge 126 is indicated in FIG. 2.

The seat 160 used may be pivotable (pivotably mounted) and is configured to engage a human body in a seated position during an in-use condition 150. In alternate embodiments of the mountable toilet system 100 the seat 160 is removably coupleable to the seat-platform 140 via at least one fastener. Any suitable faster (fastening means) may be used such as pins, bolts/nuts, clips, clasps and the like. The seat-platform 140 may comprises a second-hinge 142 and a third-hinge 144 (shown in FIG. 2) such that the seat-platform 140 is able to rotate (about centerlines indicated) in relation to the bottom-engager 130, as shown. As such, the present invention comprises at least two centerlines of possible rotation, as shown in FIG. 2, permitting the apparatus to have a biasing means when sat upon to apply downward force (as indicated in FIG. 1). The seat-platform 140 preferably comprises a plurality of support bars 146 to support the seat 160 when sat upon by a user. The seat-platform 140 further preferably comprises hooks 149 (shown in FIG. 4) for removably receiving a droppings-bag 10 underneath a plane of the seat-platform 140 during in-use conditions 150 (FIG. 1). In preferred embodiments the plurality of support bars 146 comprise a left-side-support-bar 147 and a right-side-support-bar 148 substantially parallel to each other and a rear-cross-bar 143 perpendicular to the left-side-support-bar 147 and the right-side-support-bar 148, each of the left-side-support-bar 147 and the right-side-support-bar 148 having the second-hinge 142 and the third-hinge 144 attached respectively (shown in FIG. 3) such that the bottom-engager 130 is able to rotate in relation to the seat-platform 140. Certain embodiments may comprise a front-cross-bar.

Referring now to FIG. 4, the seat 160 (shown from a bottom side) may be removably coupleable to a top of the seat platform 140. via VELCRO® (hook and loop) or other suitable fastening means. The hooks 149 are shown as well (preferably four hooks 149) and provide a means by which to removably secure the droppings-bag 10 for use (shown coupled in FIG. 1).

Figure 6:
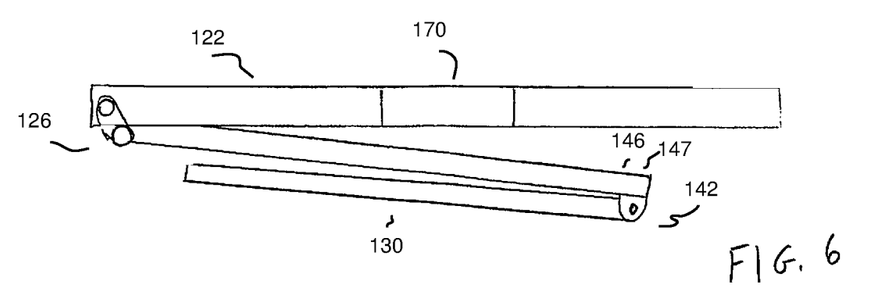
FIG. 6 is a side view of the mountable toilet system of FIG. 1 in collapsed form, according to an embodiment of the present disclosure.
Figure 7:
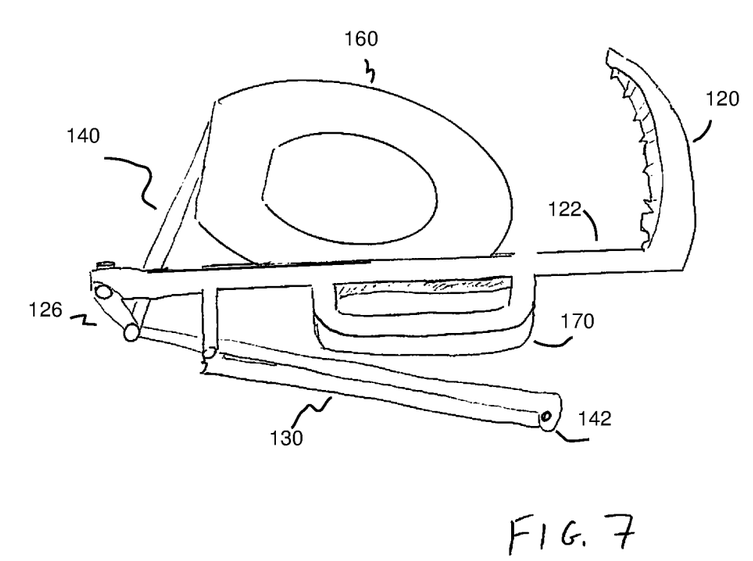
FIG. 7 is a side perspective view of the mountable toilet system of FIG. 1 in collapsed form, according to an embodiment of the present disclosure.

Referring now to the collapsible nature of the present invention, FIG. 6 and FIG. 7 show the product when folded up into collapsed form. First hinge 126 folds to closed position. Second hinge 142 closes to align bottom engager with support bar 146, with left-side support bar 147 shown. Either left side of right side support bar may mate and hinge with the support bar. Similarly, straight-arm may be affixed to the right side. Straight arm 122 with handle 170 aligns near support bar 146, and bottom engager 130 may align parallel with support bar 146. In alternative embodiments, all bars may align parallel with extending hinges, or may overlap to provide an extremely slim profile (not shown) approximately the height of the width of the largest bar. Top engager affixed on the end of straight-arm, which in turn attaches to seat platform 140.

Referring now to the means by which the present invention positively couples to the vertical member 5; the toothed-hook 124 of the top-engager 120 and the toothed-terminal end 132 of the bottom-engager 130 engage the vertical member 5 at a slight curve with the apexes of the teeth grasping to the vertical member 5 on a back side and a front side of the vertical member 5 but not entirely around so the present invention is easy to install and to remove from use, as shown in FIG. 1. The vertical member 5 referred to herein comprises a post with a diameter such as a post (not shown) or a tree trunk (shown in FIG. 1). The present invention, given its design, is able to accommodate to 'non-perfectly cylindrical' vertical member(s) 5 such as tree trunks making it convenient for use.

Figure 5:
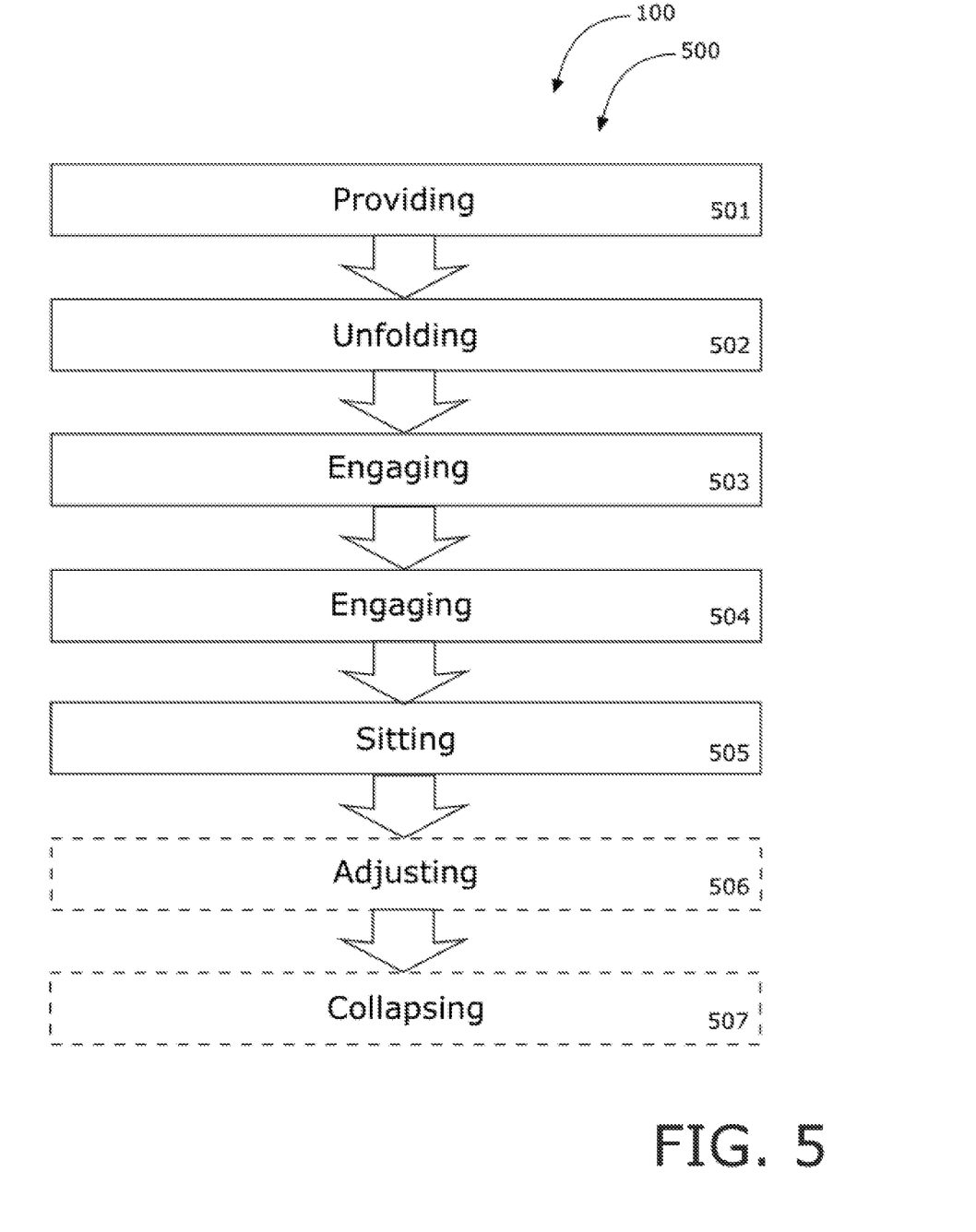
FIG. 5 is a flow diagram illustrating a method of use for the mountable toilet system, according to an embodiment of the present disclosure.

Referring now to FIG. 5 showing a flow diagram illustrating a method of use 500 for mountable toilet system 100, according to an embodiment of the present disclosure. In particular, the method of use 500 may include one or more components or features of the mountable toilet system 100 as described above. As illustrated, the method of use 500 may include the steps of: step one 501, providing a mountable toilet assembly including a frame having; a top-engager including a straight-arm with a toothed-hook; the toothed hook configured to removably frictionally engage a tree trunk; a bottom-engager having a toothed-terminal end for engaging the vertical member; a seat-platform hindgedly coupled to the straight-arm of the top-engager via a first-hinge; and a seat; step two 502; unfolding the top-engager, the seat-platform, and the bottom-engager via rotating each in relation to one another (via hinges) respectively in series; step three 503, engaging the toothed-hook with a back of the tree trunk; step four 504 engaging the toothed-terminal end to a front of the tree trunk; step five 505, sitting on the seat as a human body in a seated position during an in-use condition; step six 506 adjusting positioning of the mountable toilet assembly in relation to the tree trunk; step seven 507 collapsing the mountable toilet assembly for transport and storage. Further optional steps may include placing a roll of toilet paper on the projecting toilet paper roll bar and using the roll sequentially as well as hanging a bag from the hooks provided may be included and the bag may be removed for discard. Further the device when moved may be carried via a handle and certain embodiments may be telescoping.

What is claimed new and desired to be protected by Letters Patent is set forth in the appended claims:

1. A mountable toilet system comprising:
    a frame having a seat-platform hingedly coupled on a near end with a top-engager, and said seat-platform hingedly coupled with a bottom-engager on a far end;
    said top engager comprising a telescopic straight-arm having a first end and a second end; said straight-arm comprising a first hinge at said first end coupled to said seat-platform near end, and further comprising a toothed-hook along said second end; said toothed-hook configured to engage a vertical support member;

said bottom-engager having a support member, said support member comprising a front hinge point coupled to said seat-platform, and a toothed-terminal end, said toothed terminal end configured to engage said vertical support member; and a seat coupled to said seat-platform.

2. The mountable toilet system of claim 1, wherein said mountable toilet assembly further comprises a closed-loop handle coupled to said frame located on said top-engager.

3. The mountable toilet system of claim 2, wherein said closed-loop handle is located on said straight-arm.

4. The mountable toilet system of claim 1, wherein said mountable toilet assembly further comprises a bar perpendicularly projecting from said straight-arm.

5. The mountable toilet system of claim 4, wherein said bar is removably fastened to said straight-arm.

6. The mountable toilet system of claim 1, further comprising a first-fastener received through the first hinge on said near end to provide coupling of said top-engager to said seat-platform.

7. The mountable toilet system of claim 1, wherein the seat is removably coupleable to said seat-platform via at least one fastener.

8. The mountable toilet system of claim 1, wherein said seat comprises a lower surface, said lower surface comprising hooks adapted to removably receive a collection bag underneath a plane of said seat.

9. The mountable toilet system of claim 1, wherein said seat-platform comprises a plurality of support bars including a left-side-support-bar and a right-side-support-bar, said left-side-support-bar and said right-side-support-bar parallel to each other, and a rear-cross-bar, said rear-cross-bar perpendicular to said left-side-support-bar and said right-side-support-bar, each of said left-side-support-bar and said right-side-support-bar having a hinge on a far end to hingedly couple with said bottom-engager.

10. The mountable toilet system of claim 1, wherein said toothed-terminal end of said bottom-engager engages a vertical support member at a curve.

11. The mountable toilet system of claim 1, wherein said toothed-terminal end of said bottom-engager engages a vertical support member, the vertical support member comprising a post with a diameter.

12. The mountable toilet system of claim 1, wherein said toothed-terminal end of said bottom-engager engages a vertical support member, the vertical support member comprising a tree trunk.

13. A mountable toilet system comprising:
a top-engager comprising a straight-arm and a toothed-hook;
a bottom-engager comprising a terminal end; and
a seat-platform hingedly coupled to said straight-arm of said top-engager via a first-hinge, and
a seat releasably mounted on said seat platform having a periphery ring and a through hole;
wherein said mountable toilet assembly further comprises a handle integral with at least one of said top-engager, said bottom-engager, and said seat-platform;
wherein said seat-platform is hingedly coupled to said bottom-engager via a second-hinge; and wherein said top-engager, said seat-platform, and said bottom-engager are able to rotate in relation to one another respectively to align said seat-platform, said top-engager, and said bottom-engager in parallel.

14. A method of use for mountable toilet system, the method comprising the steps of:
providing a mountable toilet assembly including a frame having: a top-engager including a telescoping straight-arm with a toothed-hook; a bottom-engager having a terminal end for engaging a vertical support; a seat-platform hingedly coupled to the straight-arm via a first-hinge and hingedly coupled to the bottom-engager via a second hinge, and a seat;
hooking the top-engager around the vertical support;
engaging the toothed-hook with a back of the vertical support;
placing the terminal end on a front of the vertical support;
orienting, the seat-platform horizontally; and
arranging said seat on the seat-platform.

15. The method of claim 14, further comprising the step of attaching a collection bag to the assembly below an aperture in the seat.

16. The method of claim 15, further comprising the step of removing the collection bag from the assembly.

17. The method of claim 14, further comprising the steps of collapsing the mountable toilet assembly; and gripping a handle on the mountable toilet assembly.

18. A mountable toilet system comprising:
a frame having a seat-platform hingedly coupled on a near end with a top-engager, and said seat-platform hingedly coupled with a bottom-engager on a far end;
said top-engager comprising a straight-arm having a first end and a second end; said straight-arm comprising a first hinge at said first end coupled to said seat-platform near end, and further comprising a toothed-hook along said second end; wherein said straight-arm is hingedly connected to said toothed-hook; and said toothed-hook configured to engage a vertical support;
said bottom-engager having a support member, said support member comprising a front hinge point coupled to said seat-platform, and a toothed-terminal end, said toothed terminal end configured to engage said vertical support member; and
a seat coupled to said seat-platform.

19. The mountable toilet system of claim 18, wherein said mountable toilet assembly further comprises a bar perpendicularly projecting from said straight-arm.

20. The mountable toilet system of claim 19, wherein said bar is removably fastened to said straight-arm.

21. The mountable toilet system of claim 18, further comprising a first-fastener received through the first hinge on said near end to provide coupling of said top-engager to said seat-platform.

22. The mountable toilet system of claim 18, wherein the seat removably coupleable to said seat-platform via at least one fastener.

23. The mountable toilet system of claim 18, wherein said seat comprises a lower surface, said lower surface comprising hooks adapted to removably receive a collection bag underneath a plane of said seat.

24. The mountable toilet system of claim 18, wherein said seat-platform comprises a plurality of support bars including a left-side-support-bar and a right-side-support-bar, said left-side-support-bar and said right-side-support-bar parallel to each other, and a rear-cross-bar, said rear-cross-bar perpendicular to said left-side-support-bar and said right-side-support-bar, each of said left-side-support-bar and said rightside-support-bar having a hinge on a far end to hingedly couple with said bottom-engager.

* * * * *